United States Patent
Sahu et al.

(10) Patent No.: US 10,136,356 B2
(45) Date of Patent: Nov. 20, 2018

(54) METHOD FOR DATA TRANSMISSION IN WIRELESS NETWORK ENVIRONMENT AND DATA TRANSMITTER

(71) Applicant: Samsung Electronics Co., Ltd., Suwon-si, Gyeonggi-do (KR)

(72) Inventors: Samir Kant Sahu, Suwon-si (KR); Woo-jin Park, Yongin-si (KR); Hun-je Yeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/483,696

(22) Filed: Sep. 11, 2014

(65) Prior Publication Data
US 2015/0071061 A1    Mar. 12, 2015

(30) Foreign Application Priority Data
Sep. 12, 2013    (KR) .......... 10-2013-0109883

(51) Int. Cl.
*H04W 28/02* (2009.01)
*H04L 12/801* (2013.01)
*H04L 12/805* (2013.01)
*H04L 12/851* (2013.01)
*H04L 12/835* (2013.01)

(52) U.S. Cl.
CPC .......... *H04W 28/0289* (2013.01); *H04L 47/19* (2013.01); *H04L 47/2441* (2013.01); *H04L 47/30* (2013.01); *H04L 47/36* (2013.01); *H04W 28/0284* (2013.01)

(58) Field of Classification Search
CPC .......... H04W 28/0289; H04W 28/0284; H04L 47/2441; H04L 47/30; H04L 47/36
See application file for complete search history.

(56) References Cited

U.S. PATENT DOCUMENTS

| | | | | |
|---|---|---|---|---|
| 2002/0122387 | A1* | 9/2002 | Ni | H04L 29/06 370/231 |
| 2003/0161323 | A1* | 8/2003 | Harada | H04L 1/0003 370/395.21 |
| 2005/0094611 | A1* | 5/2005 | Cheong | H04L 12/5695 370/342 |
| 2005/0135302 | A1* | 6/2005 | Wang | H04W 52/0216 370/329 |
| 2005/0136833 | A1* | 6/2005 | Emeott | H04W 52/0225 455/11.1 |

(Continued)

OTHER PUBLICATIONS

Sahu et al., Dynamic Transmission Management Scheme for Throughput Enhancement in IEEE802.11 MAC Protocol, Samsung Best Paper Award 2013, Suwon-si, Korea.

*Primary Examiner* — Gregory Sefcheck
*Assistant Examiner* — Jael Ulysse
(74) *Attorney, Agent, or Firm* — Jefferson IP Law, LLP

(57) ABSTRACT

A method of transmitting data via a data transmitting device in a wireless network environment is provided. The method includes determining whether traffic is saturated or not based on an access category (AC) into which the data is classified according to a type of application that transmits the data, a queue size, and a predetermined threshold value and determining a transmission scheme according to a determination result of whether traffic is saturated or not and the AC of the data.

17 Claims, 6 Drawing Sheets

(56) References Cited

U.S. PATENT DOCUMENTS

| | | | |
|---|---|---|---|
| 2005/0141480 A1* | 6/2005 | Jin | H04L 12/4625 370/351 |
| 2005/0147041 A1* | 7/2005 | Zaki | H04L 47/14 370/235 |
| 2006/0062189 A1* | 3/2006 | Takeuchi | H04W 74/0875 370/338 |
| 2006/0083233 A1* | 4/2006 | Nishibayashi | H04L 1/1621 370/389 |
| 2006/0087974 A1* | 4/2006 | Ozer | H04L 12/2854 370/235 |
| 2006/0112161 A1* | 5/2006 | Spalink | H04L 12/2803 709/200 |
| 2006/0187840 A1* | 8/2006 | Cuffaro | H04W 48/06 370/235 |
| 2007/0127378 A1* | 6/2007 | Yang | H04L 43/00 370/235 |
| 2007/0189298 A1* | 8/2007 | Wong | H04L 47/15 370/395.1 |
| 2007/0206639 A1* | 9/2007 | Zhao | H04L 47/10 370/477 |
| 2007/0217339 A1* | 9/2007 | Zhao | H04N 21/23805 370/252 |
| 2007/0286221 A1* | 12/2007 | Wu | H04L 12/403 370/412 |
| 2008/0056125 A1* | 3/2008 | Kneckt | H04L 41/00 370/229 |
| 2008/0056297 A1* | 3/2008 | Gaur | H04W 74/0816 370/447 |
| 2008/0171550 A1* | 7/2008 | Zhao | H04W 74/02 455/445 |
| 2008/0232285 A1* | 9/2008 | Aad | H04W 74/02 370/310 |
| 2009/0135726 A1* | 5/2009 | Balan | H04L 41/147 370/241 |
| 2009/0232001 A1* | 9/2009 | Gong | H04L 47/10 370/236 |
| 2009/0323528 A1* | 12/2009 | Loiacono | H04L 47/10 370/235 |
| 2010/0208579 A1 | 8/2010 | Stephens | |
| 2011/0019557 A1* | 1/2011 | Hassan | H04L 47/10 370/252 |
| 2011/0134751 A1* | 6/2011 | Balan | H04L 43/00 370/230.1 |
| 2011/0305139 A1* | 12/2011 | Kwak | H04W 28/14 370/230 |
| 2012/0051342 A1* | 3/2012 | Liu | H04W 72/10 370/338 |
| 2012/0182886 A1* | 7/2012 | Ong | H04W 74/0816 370/252 |
| 2013/0077486 A1* | 3/2013 | Keith | H04L 47/2433 370/230.1 |
| 2013/0286826 A1* | 10/2013 | Park | H04W 28/0231 370/230 |

* cited by examiner

| AC | BER1 | | | BER2 | | | BER3 | | |
|---|---|---|---|---|---|---|---|---|---|
| | Fsmin | FSopt | Fsmax | Fsmin | FSopt | Fsmax | Fsmin | FSopt | Fsmax |
| 0(BK) | | | | | | | | | |
| 1(BE) | | | | | | | | | |
| 2(VID) | | | | | | | | | |
| 3(VOC) | | | | | | | | | |
| 4(HP) | | | | | | | | | |

METHOD FOR DATA TRANSMISSION IN WIRELESS NETWORK ENVIRONMENT AND DATA TRANSMITTER

CROSS-REFERENCE TO RELATED APPLICATION(S)

This application claims the benefit under 35 U.S.C. § 119(a) of a Korean patent application filed on Sep. 12, 2013 in the Korean Intellectual Property Office and assigned Serial No. 10-2013-0109883, the entire disclosure of which is hereby incorporated by reference.

TECHNICAL FIELD

The present disclosure relates to a method and apparatus for transmitting data in a wireless network. More particularly, the present disclosure relates to a method and apparatus for providing a real-time traffic optimization protocol with dynamic aggregation and fragmentation.

BACKGROUND

With the increased number of mobile communication devices using a wireless network, such as smart phones and tablet personal computers (PCs), wireless networks, such as a wireless local area network, have been widely constructed. Based on the wireless networks, various services are used through the mobile communication devices by using various applications.

As devices based on the IEEE 802.11n wireless LAN standards have increased, data transmission and reception through an aggregate medium access control protocol data unit (A-MPDU) has increased. The data transmission and reception using the A-MPDU is one of the main characteristics of IEEE 802.11n. The A-MPDU includes media access control (MAC) protocol data units (MPDUs) and is transmitted to one physical layer convergence procedure service data unit (PSDU) by a physical layer (PHY).

A data transmitting device connected in the wireless network obtains a transmission opportunity (TX opportunity) by a MAC algorithm and transmits data by using an obtained transmission time. To transmit the data during the obtained transmission time, the data transmitting device transmits the data by fragmenting the data by protocol data unit (PDU) fragmentation, when transmitting a large amount of data. However, because the data was transmitted by using static PDU fragmentation, a sufficient wireless bandwidth cannot be provided when transmitting the large amount of data.

Also, since traffic which has various requirements occurs as the data transmitting device provides various applications, loads become high. Thus, there is a need for a method of efficiently aggregating traffic which has different requirements. That is, when various kinds of traffic occur, there is a need for a method of adaptively aggregating and fragmenting the various kinds of traffic.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of transmitting data in a wireless network and a data transmitting device.

Another aspect of the present disclosure is to provide a method of transmitting data, which improves transmission performance and efficiency by providing a method for efficient aggregation and fragmentation at a media access control (MAC) level of a wireless local area network, and a data transmitting device.

Another aspect of the present disclosure is to provide a method of transmitting data through a real time optimization protocol using dynamic aggregation and fragmentation, the method meeting the needs of various quality of services (QoSs) of traffic and improving the transmission performance, and a data transmitting device.

Additional aspects will be set forth in part in the description which follows and, in part, will be apparent from the description, or may be learned by practice of the presented embodiments.

In accordance with an aspect of the present disclosure, a method of transmitting data via a data transmitting device in a wireless network environment is provided. The method includes determining whether traffic is saturated or not based on an access category (AC) into which the data is classified according to a type of application that transmits the data, a queue size, and a predetermined threshold value, and determining a transmission scheme according to a determination result of whether traffic is saturated or not and the AC of the data.

The determining of the transmission scheme may include choosing at least one of a frame aggregation or fragmentation scheme and waiting time.

The determining of whether traffic is saturated or not may include determining the AC to which the data belongs, calculating the queue size per the AC of the data, and comparing the queue size and the predetermined critical value, and, if the queue size is equal to or greater than the predetermined critical value, determining that traffic is saturated.

The determining of the transmission scheme may include obtaining a bit error rate (BER) value according to a channel condition and determining an aggregation parameter based on the AC and the BER value.

The method may further include aggregating or fragmenting a frame according to the aggregation parameter and transmitting the aggregated or fragmented frame.

The aggregation parameter may include at least one of a minimum frame size, a maximum frame size, and an optimal frame size which are determined according to the tolerance of loss rates required according to the AC.

The method may further include determining whether error adaptation is needed or not based on at least one of a channel condition and whether the AC is changed. Also, the method may further include determining the transmission scheme, if the error adaptation is determined to be needed, and transmitting the data according to the transmission scheme by which data was transmitted in a previous stage, if the error adaptation is determined not to be needed.

The determining of the transmission scheme may include determining a potential pattern of traffic and predicting next state data according to the determined potential pattern and determining the transmission scheme by using the next state data, wherein the next state data may include a queue size, a data rate, and an AC of data which is to be transmitted after the data transmitted by the data transmitting device.

The predicting of the next state data may include determining the potential pattern of the traffic by using a data mining technique.

The AC may include at least one of voice, video, and best-effort transmission.

In accordance with an aspect of the present disclosure, a data transmitting device that transmits data in a wireless network is provided. The device includes a transmission scheme determination unit which is configured to determine whether traffic is saturated or not based on an AC into which the data is classified according to a type of application that transmits the data, a queue size, and a predetermined threshold value and to determine a transmission scheme according to a determination result of whether traffic is saturated or not and the AC of the data.

The transmission scheme determined by the transmission scheme determination unit may include at least one of a frame aggregation or fragmentation scheme and waiting time.

The transmission scheme determination unit may determine the AC to which the data belongs, compares the queue size and the predetermined critical value per the AC of the data, and, when the queue size is equal to or greater than the predetermined critical value, determines that traffic is saturated.

The device may further include a BER engine that obtains a BER value according to a channel condition. The transmission scheme determination unit may determine an aggregation parameter based on the AC and the BER value.

The data transmitting device may aggregate or fragment a frame according to the aggregation parameter. Also, the device may further include a data transmitting unit that transmits the aggregated or fragmented frame.

The aggregation parameter may include at least one of a minimum frame size, a maximum frame size, and an optimal frame size which are determined according to the tolerance of loss rates required according to the AC.

The device may further include an error adaptation determination unit that determines whether error adaptation is needed or not based on at least one of a channel condition and whether the AC is changed or not. The transmission scheme determination unit may determine the transmission scheme when the error adaptation determination unit determines that the error adaptation is needed.

The transmission scheme determination unit may determine a potential pattern of traffic, may predict next state data according to the determined potential pattern, and may determine the transmission scheme by using the next state data, wherein the next state data may include a queue size, a data rate, and an AC of data which is to be transmitted after the data transmitted by the data transmitting device.

The transmission scheme determination unit may determine the potential pattern of the traffic by using a data mining technique.

The AC may include at least one of voice, video, and best-effort transmission.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Hereinafter, embodiments of the present disclosure will be described by referring to the attached drawings.

Figure 1:
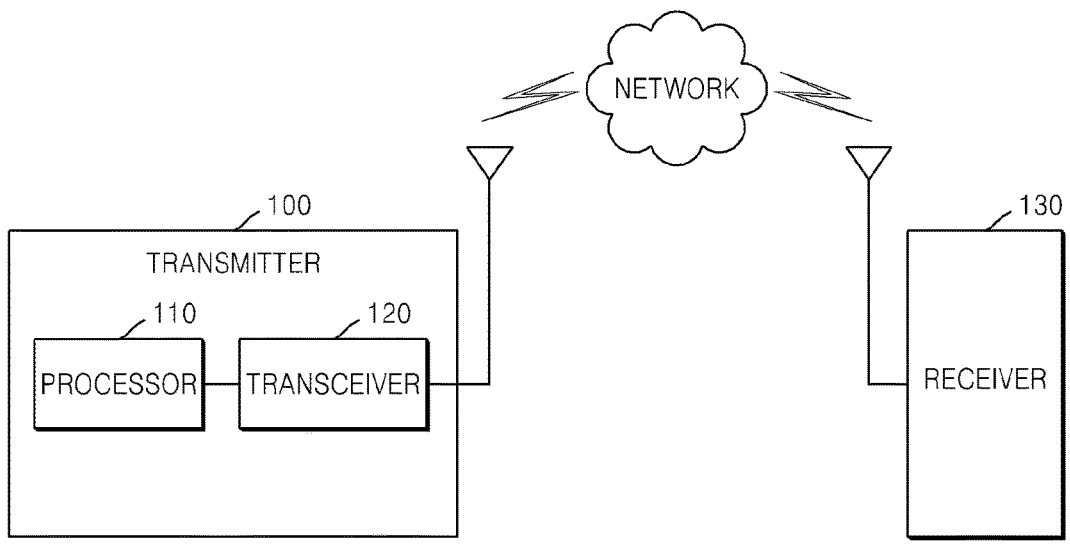
FIG. 1 is a view of a data transmitting device and a data receiving device according to an embodiment of the present disclosure.

FIG. 1 is a view of a data transmitting device and a data receiving device according to an embodiment of the present disclosure.

Referring to FIG. 1, a transmitter 100, which is the data transmitting device, may transmit data to a receiver 130 through a network. The transmitter 100 according to embodiments of the disclosure may include any device that can perform data communication. For example, the transmitter 100 may include a desktop computer, a cellular phone, a personal digital assistant (PDA), a smart phone, a tablet personal computer (PC), a notebook, etc. However, the transmitter 100 is not limited thereto. The receiver 130 according to embodiments of the disclosure may also include any device that can perform data communication. For example, the receiver 130 may include a desktop computer, a cellular phone, a PDA, a smart phone, a tablet PC, a notebook, etc. However, the receiver 130 is not limited thereto.

The transmitter 100 may include a processor 110 and a transceiver 120. The processor 110 may perform various calculations and control other units of the transmitter 100. The transceiver 120 may transmit or receive data through the network. However, the present disclosure is not limited thereto. For example, the transmitter 100 may include more components or exclude some components. Alternatively, the processor 110 and the transceiver 120 included in the transmitter 100 may be substituted by other components. For example, the transmitter 100 may include an additional transmitting device and an additional receiving device instead of the transceiver 120 including a transmitting device and a receiving device.

The network may include a wireless network and a wired network. In particular, the wireless network may have a higher probability of network condition change and error occurrence than the wired network, due to signal intervention, attenuation, fading effects, etc. In this specification, errors may include not only data errors but also data loss during the performance of any kind of data communication. In other words, errors may include a case where data transmitted by a transmitting device is not transmitted to a receiving device as well as a case where data content such as a packet is wrong.

When there are a plurality of transmitters 100 that transmit data through the network, the transmitters 100 may obtain a transmission opportunity (TX opportunity) from a network coordinator and transmit data during a transmission time according to the obtained TX opportunity. However, when a large amount of data is transmitted during the transmission time, data errors or loss rates may increase. Thus, the data to be transmitted needs to be appropriately fragmented. In contrast, when the data is transmitted by being fragmented or in a small amount, the obtained TX opportunity is not sufficiently utilized, thereby not providing a sufficient bandwidth. Therefore, there is also a need to appropriately aggregate the data to be transmitted.

The processor 110 of the transmitter 100 may determine whether traffic is saturated based on an access category (AC), according to which data is classified according to a type of application that transmits the data, a queue size, and a predetermined threshold value. Also, the processor 110 may determine a transmission scheme for appropriately transmitting the data, according to the AC and a determination result of whether traffic is saturated or not. Also, the processor 110 may determine a frame error rate (FER) that the data traffic requires according to the AC.

Throughout this specification, the AC denotes classifying traffic flows according to the priority order of applications transmitted by the traffic flows. For example, the traffic flows may be classified into voice, video, best-effort transmission, etc, according to the AC. The traffic flow classified as a voice has a characteristic that a small amount of data is transmitted without delay. The traffic flow classified as a video has a characteristic that a large amount of data is transmitted. The traffic flow classified as a best-effort transmission has a characteristic that the tolerance for delay is relatively high. The queue size may denote a size of a packet which is dequeued to transmit the data. In this specification, the AC of data denotes the AC of the data traffic.

The predetermined critical value is a value to define traffic saturation with respect to a data queue. When a queue size is larger than the predetermined critical value, it may be determined that traffic is saturated. In general, a packet, which requires a low delay, has a shorter packet length than a packet, which requires a high processing rate. For example, when a file is uploaded by file transfer protocol (FTP), the data has to be fragmented into a number of packets to be transmitted, for a high processing rate. On the contrary, in the case of voice (for example, VoIP), which requires a low delay, the data should be quickly transmitted as a small packet. Accordingly, the critical value may be configured according to the AC according to requirements of data to be transmitted.

Figure 2:
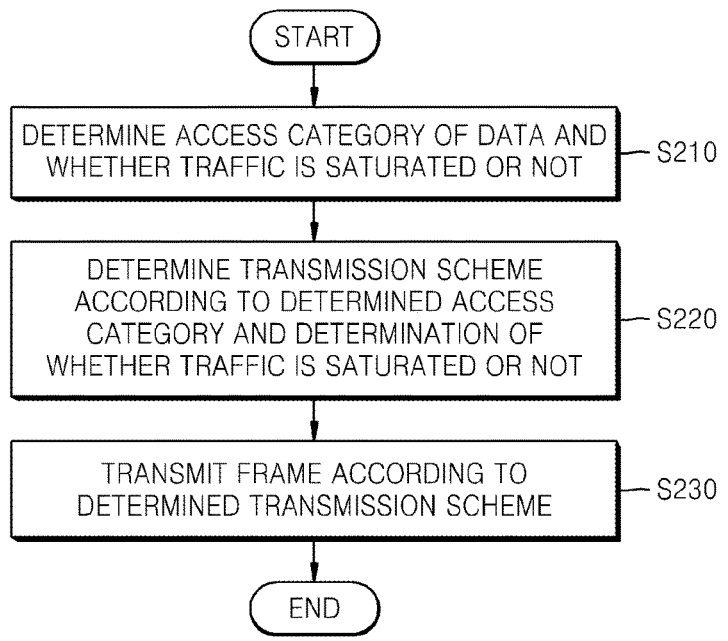
FIG. 2 is a flowchart of a process in which data is transmitted according to an embodiment of the present disclosure.

FIG. 2 is a flowchart of a process in which data is transmitted according to an embodiment of the present disclosure.

Referring to FIG. 2, the data transmitting device may determine an AC of the data to be transmitted and whether traffic is saturated or not in operation S210. The data transmitting device may determine the AC, and, when a queue size, which is a size of the data to be transmitted, exceeds a predetermined critical value, determine that the traffic is saturated.

The data transmitting device may determine a transmission scheme according to the determination of traffic saturation and the AC of the data, in operation S220. Table 1 may be referred to as an example for describing the transmission scheme which is determined in operation S220.

TABLE 1

| Saturation | Access Category | Transmission Scheme |
|---|---|---|
| High Rate Traffic/Saturated | Voice | Zero Waiting, No Aggregation, Bursting |
| | Video | Zero Waiting, DAF Scheme |
| | BE | Optimal Waiting, Forced Limit Frame aggregation using DAF, No reverse Data |
| Unsaturated | Voice | Zero Waiting, No Aggregation, Bursting |
| | Video | Optimal Waiting, DAF Scheme |
| | BE | Optimal Waiting, DAF Scheme, Bidirectional Data |

Referring to Table 1, when the AC is voice, the data transmitting device may determine as the transmission scheme a way in which the data is to be transmitted by using packet bursting without waiting time and aggregation. Also, when the traffic is saturated or crowded and the AC is video, the data transmitting device may determine as the transmission scheme a way in which the data is to be transmitted by using dynamic aggregation/fragmentation without waiting time. Also, when the traffic is not saturated and the AC is video, the data transmitting device may determine as the transmission scheme a way in which the data is to be transmitted by using dynamic aggregation/fragmentation according to optimal waiting time. When the traffic is saturated or crowded and the AC is best-effort, the data transmitting device may determine as the transmission scheme a way in which the data is to be transmitted by using dynamic aggregation/fragmentation according to optimal waiting time and only data is transmitted without receiving the data. In addition, when the traffic is not saturated and the AC is best-effort, the data transmitting device may determine as the transmission scheme a way in which the data is to be transmitted by using dynamic aggregation/fragmentation according to optimal waiting time and performing bi-directional communication.

Different dynamic aggregation/fragmentation schemes may be determined according to a channel condition and the AC. For example, when a bit error rate (BER) of a channel is high, a frame may be aggregated/fragmented to transmit a smaller amount of data during a transmission time.

That is, according to embodiments of the disclosure, the data transmitting device may choose at least one of the frame aggregation and fragmentation scheme and the waiting time, to determine the transmission scheme.

The data transmitting device may transmit the frame according to the transmission scheme determined in operation S220, in operation S230.

Figure 3:
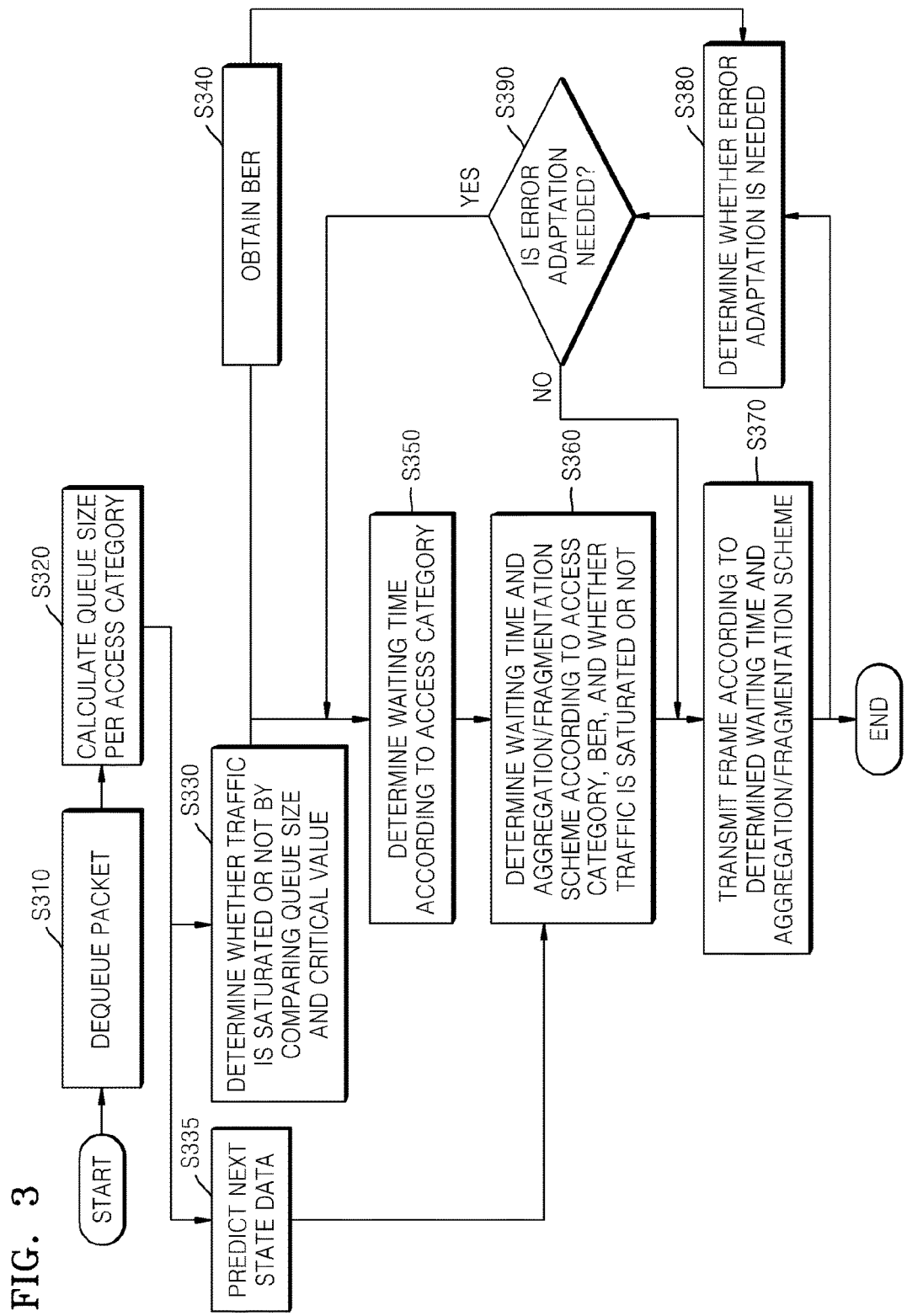
FIG. 3 is a flowchart of a process in which data is transmitted according to another embodiment of the present disclosure.

FIG. 3 is a flowchart of a process in which data is transmitted according to an embodiment of the present disclosure.

Referring to FIG. 3, the data transmitting device dequeues a packet in a transmission queue in operation S310. The data transmitting device may calculate a queue size according to the AC in operation S320 and may determine whether traffic is saturated by comparing the queue size with a critical value in operation S330. The critical value may be different according to the AC.

According to an embodiment, to determine the traffic saturation, the data transmitting device may determine the AC to which the data belongs, calculate the queue size according to the AC of the data, compare the queue size with a predetermined critical value, and, when the queue size is the same as or higher than the predetermined critical value, may determine that the traffic is saturated. Here, the queue size may denote a size of the data to be transmitted by being withdrawn from the queue.

The data transmitting device may obtain a BER value from a previous transmission by using a BER engine in operation S340. When a signal to noise ratio (SNR) value with respect to the data transmitted is updated from a receiver, the BER engine may calculate the BER value from the updated SNR value.

The data transmitting device may determine a transmission scheme according to the AC. The data transmitting device may determine a waiting time according to the AC in operation S350 and may determine an aggregation/fragmentation scheme according to the AC, the BER value, and the determination of traffic saturation in operation S360. However, in the case of an initial transmission, the BER value is hard to obtain, and thus, the BER value may not be considered.

The data transmitting device may transmit a frame aggregated/fragmented according to the determined transmission scheme, that is, according to the determined waiting time and aggregation/fragmentation scheme, in operation S370.

The data transmitting device may determine whether error adaptation is needed or not in a next transmission in operation S380. In S380, the data transmitting device may determine whether the error adaptation is needed or not according to the BER, a predetermined FER according to the AC, and a frame size. When the AC of a traffic flow is changed or the BER value according to a channel condition is changed, the data transmitting device may determine that the error adaptation is needed, in operation S390. Here, the data transmitting device may re-determine the transmission scheme by performing operations S350 and S360 in the next transmission. On the contrary, if it is determined that the error adaptation is not needed in operation S390, the data transmitting device may transmit a frame by the transmission scheme which is used in the previous transmission. For example, if it is determined that an FER according to a size of the frame which is presently transmitted exceeds a tolerance limit of the FER required according to the AC of the traffic, as the channel condition is changed, the data transmitting device may change the transmission scheme to reduce the size of the frame to be transmitted.

Like this, according to a protocol based on a dynamic decision which reflects the network channel condition in real time, computational costs may increase. By this, the throughput of the entire system may rather decrease. To address this problem, the next state data traffic may be predicted in operation S335 to increase the throughput and reduce the transmission delay. Here, the next state data may include a queue size, a data rate, and an AC, with respect to the data to be transmitted after the data which is transmitted. However, embodiments of the present disclosure are not limited thereto. Here, the data transmitting device may determine a potential pattern of the traffic by using a data mining technique and predict the next state data from the determined potential pattern. The data mining technique refers to a process which extracts future information by using an interrelation hidden among a lot of data. Algorithms for the prediction of the next state data traffic may include classification tree, random forest, and naïve-Bayesian. Also, a new mixed intelligence data mining model which is based on GA-Chaos optimized Radial Base Function (RBF) and a self-organizing feature map (SOFM) may be considered. According to an embodiment, by predicting the next state data, the data transmitting device may omit the queue size calculation and calculations for determining the waiting time control algorithm and optimal frame size.

Figure 4:
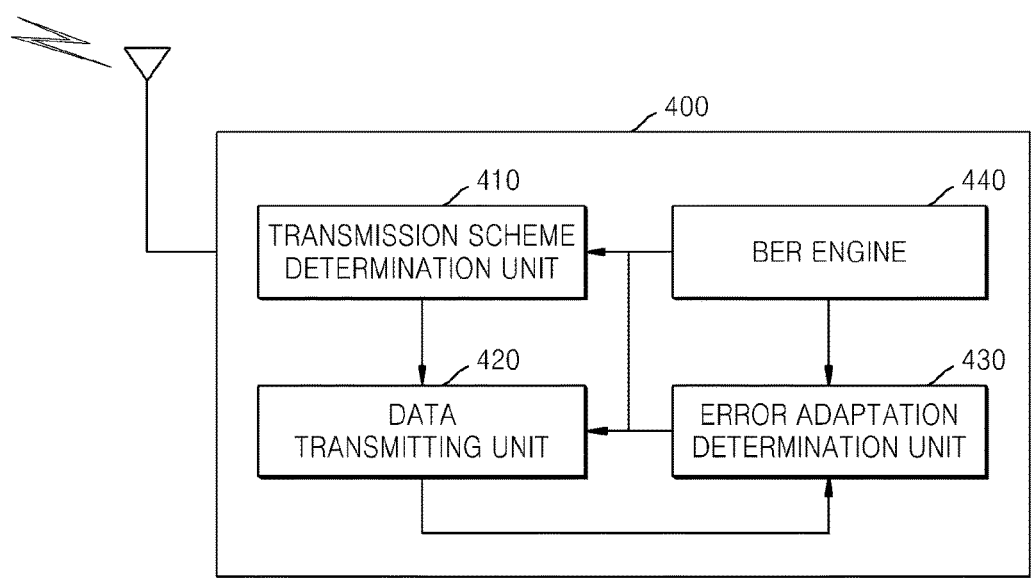
FIG. 4 is a view of a data transmitting device according to an embodiment of the present disclosure.

FIG. 4 is a view of a data transmitting device according to an embodiment of the present disclosure. It is to be understood that the data transmitting device 400 illustrated in FIG. 4 is only exemplary and the data transmitting device 400 may be formed of more or less components than components illustrated in FIG. 4.

Referring to FIG. 4, the data transmitting device 400 may include a transmission scheme determination unit 410, a data transmission unit 420, an error adaptation determination unit 430, and a BER engine 440.

The BER engine 440 may monitor a channel condition of a network. When there is a change in a BER, the BER engine 440 may update the BER based on an updated SNR if the SNR is updated from a receiver.

The transmission scheme determination unit 410 may be formed of a processor which is configured to determine a transmission scheme for appropriately transmitting data, based on an AC and a determination of traffic saturation. The transmission scheme determination unit 410 may determine the transmission scheme in consideration of the BER updated by the BER engine 440 in order to reflect the channel condition of the network in real time. Also, the transmission scheme determination unit 410 may determine the transmission scheme according to the AC of data traffic and whether the network traffic is saturated or not. For example, the transmission scheme determination unit 410 may determine the transmission scheme as illustrated in Table 1 and may perform aggregation and fragmentation according to an aggregation parameter that is determined based on the BER. Here, the aggregation parameter may be determined according to the BER and the AC with reference to a configuration file. The aggregation parameter may include at least one of a minimum frame size, a maximum frame size, and an optimal frame size.

According to an embodiment, the aggregation parameter may be determined according to the AC and the BER. As the BER of a channel is high, the size of the frame to be transmitted increases, and thus, an FER rapidly increases. Also, a tolerance limit with respect to the FER may be determined according to AC. Thus, the data transmitting device may determine the aggregation parameter such that data is transmitted in a frame size in which the FER, which is determined according to the BER and the frame size of the present channel, does not exceed the tolerance limit of the FER that is required according to the AC of the data traffic. According to an embodiment, the aggregation parameter may be determined by using a configuration file which is available to be upgraded.

Also, the transmission scheme determination unit 410 may determine a potential pattern of traffic and predict next state data according to the determined potential pattern, thereby reducing computational costs for dynamically determining the transmission scheme. The next state data may include a queue size, a data rate, and an AC with respect to the data which is to be transmitted after previously transmitted data. Here, the next state data may be predicted by using the data mining technique.

The error adaptation determination unit 430 may determine whether the transmission scheme needs to be changed to adapt the FER related to the frames transmitted to the receiver.

The data transmission unit 420 may include a transmitter to transmit data. For example, the data transmission unit 420 may include the transceiver 120 of FIG. 1. The data transmission unit 420 may aggregate and fragment a frame according to the aggregation/fragmentation scheme determined by the transmission scheme determination unit 410.

For an initial transmission, the data transmission unit 420 may transmit the frame according to the transmission scheme determined by the transmission scheme determination unit 410. If the error adaptation determination unit 430 determines that no error adaptation is needed, the data transmission unit 420 may transmit the frame according to the transmission scheme used in the previous transmission. Otherwise, if the error adaptation determination unit 430 determines that error adaptation is needed, the transmission scheme determination unit 410 may determine the transmission scheme and the data transmission unit 420 may transmit the frame according to the transmission scheme determined by the transmission scheme determination unit 410.

Figure 5:
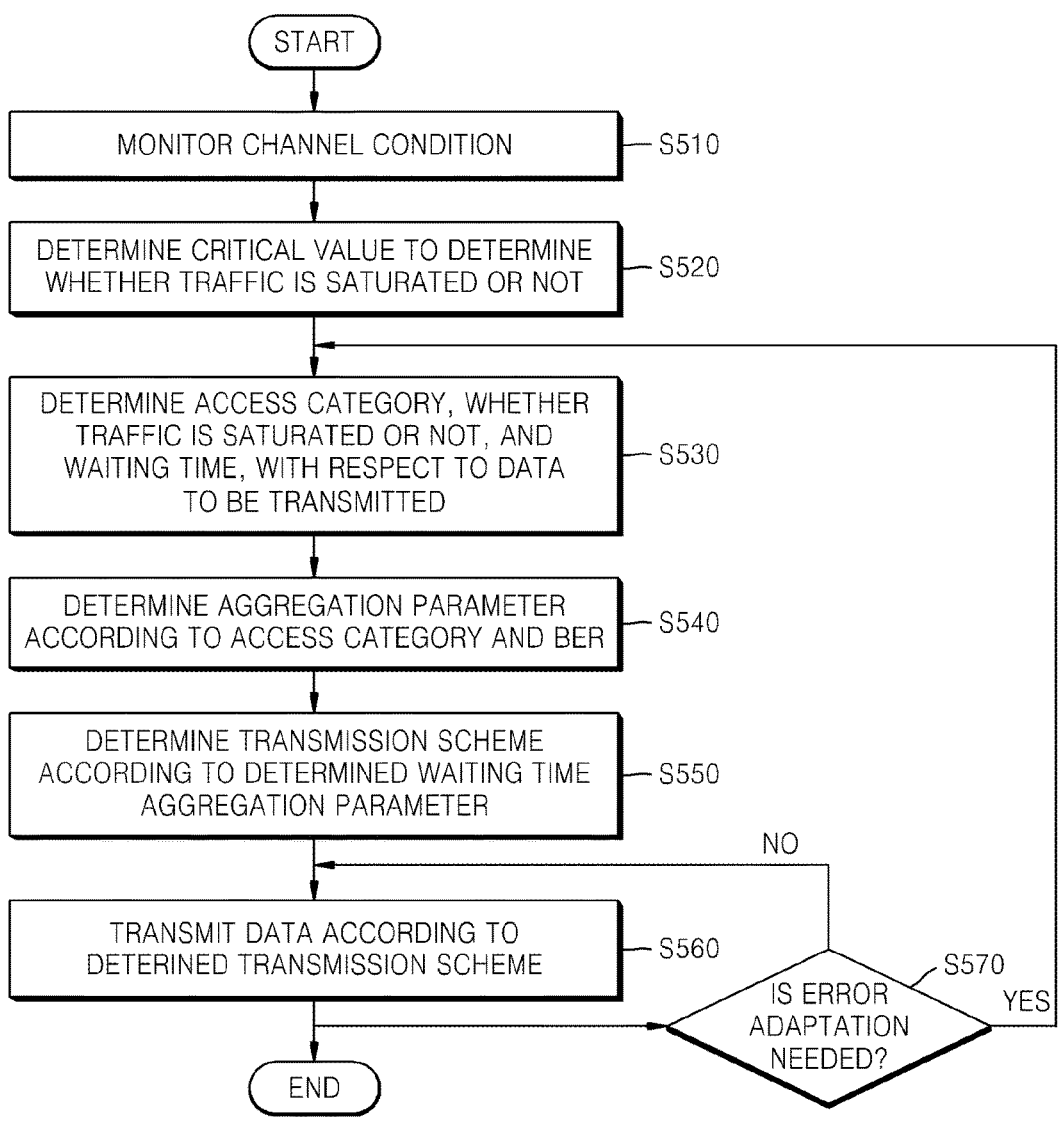
FIG. 5 is a flowchart of a process in which data is transmitted according to an embodiment of the present disclosure.

FIG. 5 is a flowchart of a process in which data is transmitted according to an embodiment of the present disclosure.

Referring to FIG. 5, the data transmitting device may monitor a channel condition by using a BER engine in operation S510.

The data transmitting device may determine a critical value for determining whether traffic is saturated or not in operation S520 and may determine an AC, whether the traffic is saturated based on the determined critical value, and a waiting time, with respect to the data to transmit, in operation S530.

The data transmitting device may determine an aggregation parameter according to the AC and a BER in operation S540. The data transmitting device may determine a transmission scheme according to the determined waiting time and aggregation parameter in operation S550. Here, the data transmitting device may determine a size of a frame to transmit according to the aggregation parameter.

The data transmitting device may transmit data according to the determined transmission scheme in operation S560. After the data is transmitted, the data transmitting device may determine whether error adaptation is needed or not in the next transmission opportunity in operation S570. If the error adaptation is needed, the data transmitting device may re-determine the transmission scheme by performing operations S530 through S550 and transmit data according to the determined transmission scheme in operation S560. On the contrary, if the error adaptation is not needed, the data transmitting device may transmit the data according to the transmission scheme used in the previous transmission.

Figures 6, 7:
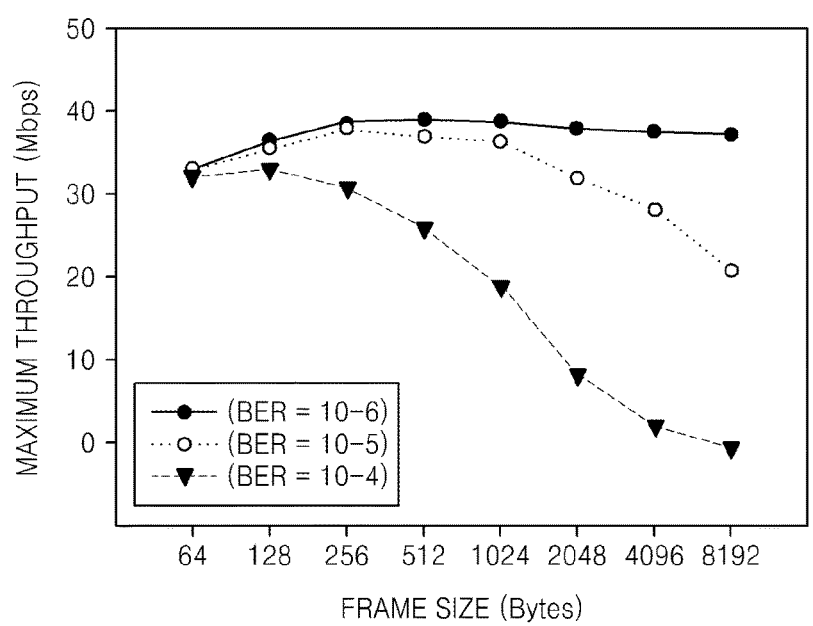
FIG. 6 is a view of a format of a configuration file according to an embodiment of the present disclosure.
FIG. 7 is a graph of a maximum throughput according to a bit error rate (BER) and a frame size, according to an embodiment of the present disclosure.

FIG. 6 is a view of a format of a configuration file according to an embodiment of the present disclosure.

Referring to FIG. 6, a data transmitting device may determine the aggregation parameter by using a configuration file having a format as illustrated. According to the configuration file of the format illustrated in FIG. 6, a minimum frame size (Fsmin), a maximum frame size (Fsmax), and an optimal frame size (FSopt) may be determined according to the BER and the AC.

To prevent repeated processing whenever transmission opportunities are obtained, while the maximum frame size (Fsmax) and the minimum frame size (Fsmin) are analytical values, the optimal frame size (FSopt) may be experimental values.

FIG. 7 is a graph of a maximum throughput according to a BER and a frame size, according to an embodiment of the present disclosure.

Referring to FIG. 7, when the BER according to a channel condition is low, the maximum throughput is not damaged even when the frame size is increased. However, as the BER rises, if the frame size exceeds a predetermined value, an FER of a frame which is transmitted increases as the frame size increases. Accordingly, retransmission of the frame occurs more often, and as a result, the maximum throughput decreases, as illustrated in FIG. 7.

Thus, according to embodiments of the present disclosure, the channel condition is monitored and an appropriate size of a frame is transmitted by dynamically fragmenting or aggregating the frame according to the channel condition.

Figure 8:
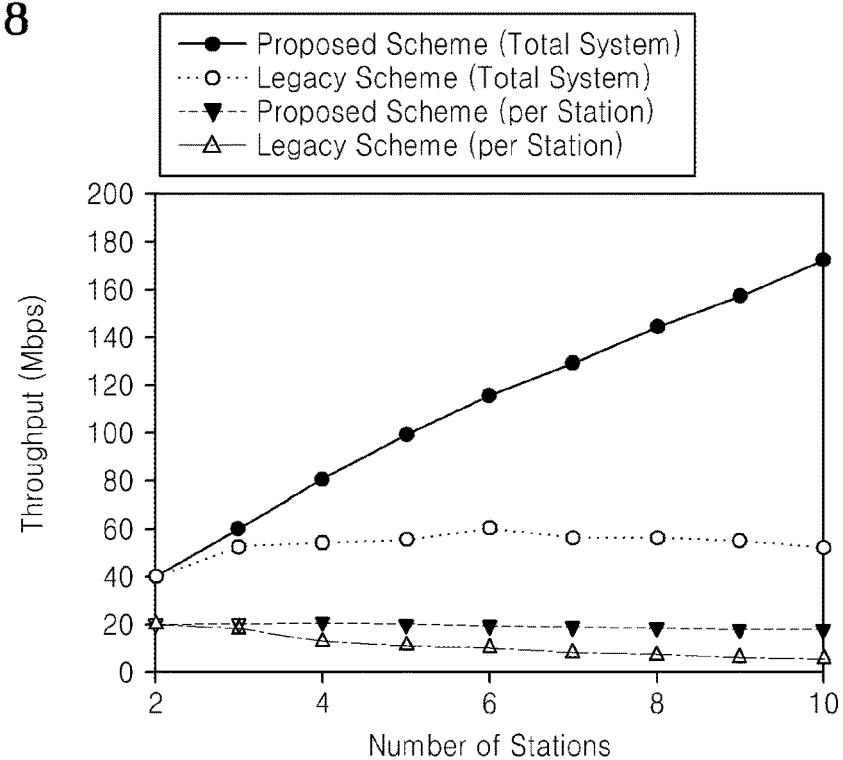
FIG. 8 is a graph of overall efficiency of a data transmission system according to an embodiment of the present disclosure.

FIG. 8 is a graph of overall efficiency of a data transmission system according to an embodiment of the present disclosure and a conventional art.

Referring to FIG. 8, it is shown that as the number of stations increases, compared to a transmission scheme of the related art, a higher throughput is obtained, according to the transmission scheme according to embodiments of the present disclosure.

Figure 9:
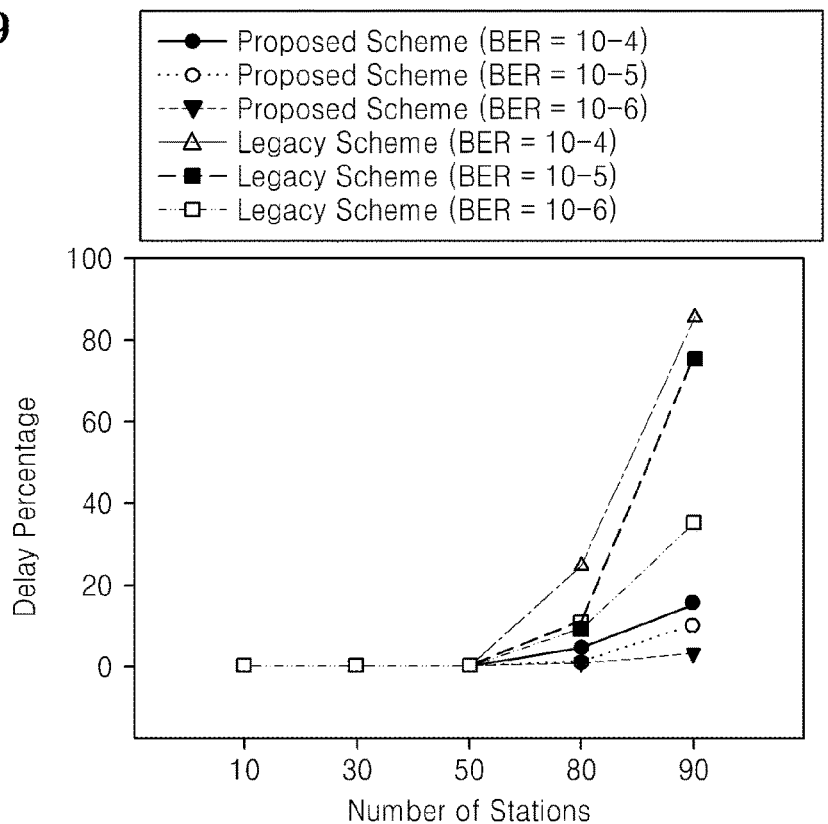
FIG. 9 is a graph of a transmission delay rate according to an embodiment of the present disclosure.

FIG. 9 is a graph of a transmission delay rate according to an embodiment of the present disclosure and conventional art.

Referring to FIG. 9, it is shown that in the transmission scheme of the related art, the transmission delay rate rapidly increases from the point where the number of stations exceeds 50. However, in the transmission scheme according to embodiments of the present disclosure, the transmission delay rate increases relatively smoothly.

Hereinafter, the BER engine will be described in more detail.

The BER engine performs error rate monitoring. A channel BER is a function of a physical layer modulation scheme and an SNR. In general, the BER may be determined by a theoretical or an experimental BER-SNR curve in a modulation and coding scheme. The BER may be represented as follows:

$$BER=0.5(1-E_{func})\sqrt{(E_b/N_0)} \qquad \text{Equation 1}$$

Here, $E_{func}$ is an error function and may be changed according to a modulation technique that is used. Also, $E_b/N_o$ is a form of signal-to-noise ratio (SNR). Considering M-ary modulation with coherent detection in Gaussian noise shannel and perfect recovery of the carrier frequency and phase, the BER may be represented by using the function Q[ ], as follows:

$$BER = \frac{2\left(1-\frac{1}{L}\right)}{\log_2 L} Q\left[\sqrt{\frac{3\log_2 L}{L^2-1} 2 \cdot (E_b/N_0)}\right] \qquad \text{Equation 2}$$

In the above equation, L is a level number of each dimension in the M-ary modulation system. $E_b$ is an energy per bit. $N_o/2$ is a noise power spectral density. Q[ ] is a Gaussian co-error function and may be represented as follows:

$$Q(x) = \int_x^\infty \frac{1}{\sqrt{2\pi}} e^{-\frac{y^2}{2}} dy \qquad \text{Equation 3}$$

The SNR may be measured by a receiver, which receives a frame. A closed-loop feedback mechanism may be used to efficiently update the SNR to a transmitter.

The BER engine may be a BER engine that uses a receiver-assisted link adaptation of the IEEE802.11n standards. A feedback of the channel condition may be provided to the transmitter by control frames of a closed-loop scheme.

After the SNR is updated, a newly calculated BER may be compared with the old BER. When there are any changes, the current BER may be updated. The current BER may be fed as an input to a frame size-BER (FS-BER) curve obtained from an analytical model using an average value of the number of stations of a network. According to the current BER, a configuration file may also be updated.

Although not shown in the drawings, a deadline first aggregation algorithm may be used to determine a transmission scheme, according to an embodiment of the present disclosure. When packets are large and quickly arrive from an upper layer in saturated data traffic, it is simple to assemble the packets in a large frame at a MAC class. However, in general, the packets arrive more slowly or in a more dense condition. Thus, there is a need to figure out an optimal waiting scheme for efficient waiting. To this end, an analytical model to prove scenarios of optimal waiting and zero waiting under different conditions and traffic categories (access categories) is provided. When assuming that there are no conflicts or errors in a network, a throughput efficiency ($\eta_f$) and an average queue size $E[q(k)]$ per frame may be represented as follows:

$$\eta_f = \frac{T_f}{T_f + \varepsilon + d \cdot T_f} = \frac{1}{1 + \varepsilon/\cdot T_f + d} \qquad \text{Equation 4}$$

-continued $$E[q(k+t)] = \alpha^t \cdot E[q(k)] + \sum_{i=0}^t \alpha^{t-1} [\alpha \cdot \varepsilon \cdot R(1+d)]$$

According to zero waiting, packets are transmitted whenever the MAC wins a transmission opportunity. In this case, a frame may be formed by aggregating the currently queed packets. Such a policy may minimize a holding delay at the MAC class. In the case of an application which is sensitive to a saturated condition or a delay, such an aggregation policy may also maximize a network throughput. As in the equation below, which is obtained by combining the two equations included in Equation 4, it is shown that the zero waiting policy may achieve the maximum efficiency in the case above.

$$\eta_f = \frac{\alpha}{1+d} = \alpha \cdot \eta_{max}, \alpha \to 1 \qquad \text{Equation 5}$$

Optimal waiting denotes waiting for an optimal time which is clocked dynamically based on the current session of transmission. Mainly in the case of traffic which is not saturated, when the optimal waiting is requested based on different conditions, a deadline may be estimated based on an earliest expiry time of a frame waiting in a queue. After the earlier expiry time passes, the frame may be removed from the queue. The deadline is an absolute time to transmit an aggregated frame without violating the deadline of any of the aggregated packets. The deadline may be obtained by subtracting a value obtained by multiplying average retransmission times and time taken for transmission of the aggregated frame from the earliest expiry time. In other words, the deadline may be obtained as follows:

$$T_{deadline} = T_{ex} - (N_{retry} \times T_{tx}) \qquad \text{Equation 6}$$

Here, $T_{ex}$ denotes the earliest expiry time. $N_{retry}$ denotes average retransmission times due to conflicts or channel errors. $T_{tx}$ denotes the time taken for transmission of the aggregated frame, the time including waiting time. $T_{deadline}$ is updated when a new frame is added in the queue.

Hereinafter, the dynamic aggregation and fragmentation scheme will be described in more detail.

Different combinations of bursting, fragmentation, and aggregation may be used, maintaining a synchronization with waiting time and optimum sizes selected from a specific channel condition based on a traffic classification and a queue size. The fragmentation and aggregation according to the an embodiment of the present disclosure may be operated in a synchronous way with bi-directional data and restricted frame aggregation.

Since small frames affect the channel errors less than large frames, the dynamic aggregation and fragmentation (DAF) scheme may fragment packets received from an upper class into small frames. The fragment size may be customized according to a current condition affecting system efficiency. These fragments may be concatenated into a large frame according to necessary defragmentation information. Again, the frame size may be determined based on other runtime parameters, such as the queue size, data saturation, and a traffic category (an AC). Therefore, the packets received from the upper class may be fragmented and then be aggregated into one large frame.

Hereinafter, error adaptation or accuracy adjustment in a next transmission will be described in more detail.

The error adaptation is necessary for applications that are sensitive to errors. A desired FER may be specified based on the type of applications.

Different tolerable delays and loss rates for different traffic classes may be maintained based on experimental results and requirements of the applications. Considering the requirement for quality of service (QoS) of a voice traffic, a loss of 1 to 2% of packets may be acceptable and a loss of 2 to 5% of packets may be acceptable in a delay of more than 30 ms. With regard to video traffic, an overall tolerable delay is 4 to 5 seconds and a tolerable loss rate is under 5%.

Therefore, a relationship among error rates, an error rate of a predetermined application, and a frame size (FS) may be constructed.

$$m \cdot BER = 1 - 10^{\left(\frac{\log(1-R)}{FS_{cur}}\right)}$$

$$FS_{cur} = \log(1-X)/\log_{10}(1-mBER)$$

$$FS_{cur} = \log(1-Y)/\log_{10}(1-mBER)$$

Equation 7

Here, when X and Y are the maximum FER and the minimum FER that are predetermined by the application, a ratio of erroneous frames to the total frames in the current aggregation is R.

According to an embodiment, a model for analyzing saturation throughput and a delay of a dynamic aggregation fragmentation (DAF) scheme according to different combinations of the frame aggregation with different limit and bi-directional data operations is provided.

Hereinafter, the model for analyzing the dynamic aggregation and fragmentation will be described. To make the calculation simple, it is assumed that Gaussian channels and bit error possibilities of all bits are the same. Also, it is assumed that bit errors are independently distributed throughout all frames.

When assuming that τ denotes a transmission probability of a station given at the start of transmission in a randomly selected slot and n denotes the number of stations in a system, the following equation may be obtained:

$$P_i = (1 - \tau)^n,$$

$$P_t = \binom{n}{1}\tau(1-\tau)^{n-1},$$

$$P_C = 1 - P_i - P_3$$

Equation 8

$P_i$, $P_t$, and $P_c$ are respectively idle, success or error, and a conflict event probability. Equation 8 may be applied to the 802.11e AC class under an assumption that packets of each class are transmitted in the same time slot of the conflict probability $P_{c_x}$. When $CW_{x\_min}$ is a minimum contention window for a specific access category ($AC_x$), an average back-off timer Tbo may start at $CW_{x\_min}$. The contention window may be doubled at every conflict until it reaches $CW_{x\_max}$. The average number of back-off time slots $T_{bo}^{means\_ts}$ by the $AC_x$ packets may be represented as follows:

$$T_{bo}^{mean\_ts} = \frac{\left(1 - P_{c_x} - P_{c_x} * 2^{CW_{x\_max}} * P_{c_x}^{CW_{x\_max}}\right)}{(1 - 2P_{c_x})} T_{1bo}$$

Equation 9

Here, x is a value of four access categories defined in the 802.11e standards and it may be that $T_{1bo} = CW_{x\_min}/2$.

In an idle slot, the transmission probability of the $AC_x$ packet, according to an approximate value, may be represented as follows:

$$P_t^{AC\_x} = \frac{1}{T_{bo}^{mean\_ts}}$$

Equation 10

When considering n stations in the network and Equation 9, the probability of $AC_x$ conflicts may be as follows:

$$P_c^{AC_x} = 1 - (1 - P_t^{AC_x})^{N-1}(1 - P_t^{AC_x})^N$$

Equation 11

Thus, the conflict probability $P_{cx}$ and $T_{bo}^{means\_ts}$ may be calculated from Equations 9, 10, and 11.

The saturation throughput $SAT_{TP}$ may be represented as a value that is obtained by dividing transmitted payload E by the slot time duration E[slot].

In the $AC_x$, a duration cycle $T_{cycle}$ is a time during which payload, SIFS, ACK, arbitration inter-frame space (AIFS), and back-off time slots are transmitted. Based on the saturation condition, the back-off time may be selected from $CW_{x\_min}$.

Assuming that $N_x$ stations select a value between 0 and $CW_{x\_min}$, the minimum waiting time $T_{wait}$ may be as follows:

$$T = \frac{T_{bo}^{mean\_ts}}{N_x + 1}$$

$$= \frac{\left(1 - P_{c_x} - P_{c_x} * 2^{CW_{x\_max}} * P_{c_x}^{CW_{x\_max}}\right)}{(N_x + 1)(1 - 2P_{c_x})} * T_{1bo}$$

$$= \frac{\left(\left(1 - P_{c_x} - P_{c_x} * 2^{CW_{x\_max}} * P_{c_x}^{CW_{x\_max}}\right)CW_{x\_min}\right)}{2(N_x + 1)(1 - 2P_{c_x})}$$

Equation 12

Therefore, the time duration for complete transmission $T_t$ may be represented as follows:

$$T_t = T_{payload} + T_{SIFS} + T_{AIFS} + T_{wait} * T_{slot}$$

Equation 13

Also, when transmission fails due to channel noise or conflicts, the transmission time is delayed for $T_{data\_e}$. Thus, the conflict time $T_c$ in an actual environment is $T_{data\_e}$.

A time interval during channel contention is wasted by data frame errors $T_{data\_e}$. Also, bi-directional data may be applied by using a dynamic aggregation fragmentation scheme for mainly PCT data in an unsaturated condition, and thus, an ACK frame error $T_{ack\_e}$ may be considered during calculation of throughput efficiency.

$$T_{data\_e} = T_{phyhdr} + T_{payload} + T_{EIFS} + T_{p\_delay}$$

$$T_{ack_e} = 2T_{phyhdr} + T_{payload} + T_{SIFS} + 2T_{p delay} + T_{DIFS} + T_{ACK}$$

Equation 14

$T_{p\_delay}$ is a propagation delay. $T_{EIFS}$ is an extended inter-frame space (EIFS). $T_{phyhdr}$ is a sum of a physical layer convergence procedure (PLCP) preamble and a header.

The data frame error rate $ER_{data\_x}$ and the ACK frame error rate $ER_{ack}$ may be represented as follows:

$$ER_{data\_x} = 1 - (1 - BER)^{FS_{data\_x}}$$

$$ER_{ack} = 1 - (1 - BER)^{FS_{ack}}$$

Equation 15

$FS_{data\_x}$ is a data frame size. $FS_{ack}$ is a MAC class ACK frame size.

Referring to Equation 8 and Equation 15, the following results may be obtained:

$$P_{er\_data\_x} = n\tau(1-\tau)^{n-1}ER_{data}$$

$$P_{er\_ack} = n\tau(1-\tau)^{n-1}(1-ER_{data\_x})ER_{ack} \qquad \text{Equation 16}$$

$P_{er\_data\_x}$ is a probability of erroneous transmission of data frames. $P_{er\_ack}$ is a probability of erroneous transmission of an ACK frame after successful transmission of ACK aggregated data. Therefore, a system throughput may be extended as follows:

$$SAT_{TP}^{DAF} = \frac{P_t^{AC_x} E_{[payload_x]}}{T_{wait}P_i + T_{data_e}P_c^{AC_x} + T_t P_t^{AC_x} + T_{ack_e}P_{er_{ack}} + T_{data_e}P_{er_{data_x}}} \qquad \text{Equation 17}$$

Because the real time optimization protocol uses DAF according to different combinations for successful transmission of bits and transmission opportunities are efficiently carried out, $E_{[payload\_x]}$ is not always the same as the MAC payload size. However, $E_{[payload\_x]}$ content may be categorized as follows:

Case1: Aggregated frame, total MAC payload
  $FS_{data\_x}$
Case2: (Aggregated frame−Corrupted fragments), Successfully retransmitted fragments
  $FS_{data\_x}-\gamma 1_{frag}$//$\gamma$ is the number of corrupted fragments
Case3: Success fully retransmitted fragments+Bidirectional data
  $FS_{data\_x}-\gamma 1_{frag}$+Bidirectional Data
Case4: Successfully retransmitted fragments+Limit Frame
  $FS_{data\_x}-\gamma 1_{frag}$+Limit Frame In Case 1 and Case 2, when m fragments are in the frame, $E_{[payload\_x]}$ may be represented as follows:

$$E_{[payload\_x]} = \sum_{\gamma=0}^{m} [\Delta \cdot (FS_{data\_x} - \gamma l_{frag})] \qquad \text{Equation 18}$$
$$= FS_{data\_x}(1 - p_e^{frag})$$

Referring to Equation 18, the system throughput may be represented as follows:

$$SAT_{TP}^{DAF} = \qquad \text{Equation 19}$$
$$P_t^{AC_x} FS_{data_x}(1-p_e^{frag}) / (T_{wait}P_i + T_{data_e}P_c^{AC_x} + T_t P_t^{AC_x} + T_{ack_e}P_{er_{ack}} + T_{data_e}P_{er_{data_x}})$$

In Equation 19, when $FS_{data\_x}$ is considered to be a large value, $FS_{data\_x}$ is the same as a function of an asymptotic system throughput.

$$FS_{data_x} = T_t \frac{SAT_{TP}^{DAF}(1-P_i)}{1-p_e^{frag}} \qquad \text{Equation 20}$$

When Equation 15 and an FER are used, $FS_{data\_x}$ may be approximated as follows:

$$FS_{data\_x} = \frac{T_t SAT_{TP}^{DAF}(1-P_i)}{(1-BER)^{lfrag}} \qquad \text{Equation 21}$$

The above equation is related to the BER of the optimal frame size that satisfies the maximum throughput. Thus, the maximum saturation throughput may be calculated according to a BER condition. The upper limit of the frame size is dependent on physical capabilities. Also, the upper limit of the frame size is determined by other factors, such as interface memory and a size of a sending buffer of a Wi-Fi station.

Hereinafter, a fragmentation size in the DAF scheme will be described in more detail.

The fragment rule in DAF is different from a single constant and mandatory fragment rule in the related art. The fragmentation size and the packing of the fragments in the aggregated frame may be changed depending upon factors, such as retransmission units or use of the transmission opportunity that is left for bi-directional data. Referring to Equations 20 and 21, the optimal fragment size according to the channel bit error rates may be determined.

According to an embodiment, to reduce complexity and the number of dynamic parameters, a fixed near-optimal array of fragmentation sizes may be used.

As an example algorithm which may be applied to an embodiment of the present disclosure, the following algorithm may be applied:

```
1:  Define a Threshold value for Saturation, SAThr
2:  The SATth is fine tuned and set in the configuration file,
3:  if any change in channel conditions
       BER is updated into the configuration file by BER engine
04: Compute the total size (size_AC_x) of frames having the same AC
       in queue
5:  if Initial transmissions
6:     if size _AC_x > SAThr // Check for Queue Saturation,
7:     Check frame access category
          Based on category of data and saturation of traffic,
                WAITING or ZERO WAITING
8:             if WAITING
9:                 Check Category of Traffic+delay sensitivity
10:                    Case: Optimum Waiting
11:                    Case: Forced Waiting
12:             else ZERO_WAITING
13:    Retrieve FSmin, FSmax, FSopt aggregation sizes for ACx
       priority based on network conditions and application FER
       from configuration file
14:    Save computation of optimum values during transmission
15:    Select the corresponding most appropriate aggregation
       scheme according to the above values
              Case: DAF
              Case: no DAF, Bursting (A-MSDU scheme)
              Case: DAF + Bidirectional Data
              Case: DAF + Limit frame aggregation
16: else // subsequent Transmissions before idle
17:    Use Next State Data Prediction by Data mining techniques
18:    Predict LOS using Non parametric Techniques
19:    Skip Steps 4-13 // Reduce Computation overhead
20: Transmit Frame
21: Accuracy adjustment and Error adaptation
22:    Get BERcurrent, Error ratio of Current Transmission
23:    Get Pre-feed application FER
24: Parallel Processing for Error Adaptation for Next Transmission
25: If Error Adaptation Required
26:    Goto Step 5
27: else
28:    Goto Step 18
```

However, the algorithm is only an example and embodiments of the present invention are not limited thereto.

One or more programs including commands for performing a method of controlling a screen editing of a display device, according to the one or more embodiments of the present disclosure, may be embodied as computer-readable codes on a computer-readable recording medium. The computer-readable recording medium includes any storage device that may store data which may be read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed over network-coupled computer systems so that the computer-readable codes are stored and executed in a distributed fashion.

While the present disclosure has been particularly shown and described with reference to various embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the present disclosure. For example, each component described in a single type may be executed in a distributed manner, and components described distributed may also be executed in an integrated form.

It should be understood that the embodiments described therein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting data via a data transmitting device in a wireless network environment, the method comprising:
    determining whether traffic is saturated or not based on an access category (AC) into which the data is classified according to a type of application that transmits the data, a queue size, and a predetermined critical value;
    determining a transmission scheme according to a determination result of whether traffic is saturated or not and the AC of the data; and
    transmitting the data according to the determined transmission scheme,
    wherein the determining of the transmission scheme comprises:
    determining, in a media access control (MAC) layer, a potential pattern of traffic and predicting next state data according to the determined potential pattern;
    determining the transmission scheme using the next state data; obtaining a bit error rate (BER) value according to a channel condition;
    determining an aggregation parameter based on the AC and the BER value;
    determining whether error adaptation is needed or not based on at least one of the channel condition and whether the AC is changed; and determining the transmission scheme if the error adaptation is determined to be needed,
    wherein the predicting of the next state data according to the determined potential pattern comprises predicting an AC of data which is to be transmitted after the data transmitted by the data transmitting device, and
    wherein the next state data comprises the predicted AC of the data which is to be transmitted after the data transmitted by the data transmitting device.

2. The method of claim 1, wherein the determining of the transmission scheme comprises choosing at least one of a frame aggregation or fragmentation scheme and waiting time.

3. The method of claim 1, wherein the determining of whether traffic is saturated or not comprises:
    determining the AC to which the data belongs;
    calculating the queue size per the AC of the data;
    comparing the queue size and the predetermined critical value; and if the queue size is equal to or greater than the predetermined critical value, determining that traffic is saturated.

4. The method of claim 1, further comprising: aggregating or fragmenting a frame according to the aggregation parameter; transmitting the aggregated or fragmented frame.

5. The method of claim 1, wherein the aggregation parameter comprises at least one of a minimum frame size, a maximum frame size, and an optimal frame size which are determined according to the tolerance of loss rates required according to the AC.

6. The method of claim 1, further comprising transmitting the data according to the transmission scheme by which data was transmitted in a previous stage, if the error adaptation is determined not to be needed.

7. The method of claim 1, wherein the next state data further comprises a queue size and a data rate of the data which is to be transmitted after the data transmitted by the data transmitting device.

8. The method of claim 1, wherein the predicting of the next state data comprises determining the potential pattern of the traffic by using a data mining technique.

9. The method of claim 1, wherein the AC comprises at least one of voice, video, and best-effort transmission.

10. A data transmitting device that transmits data in a wireless network, the data transmitting device comprising:
    a processor configured to:
    determine whether traffic is saturated or not based on an access category (AC) into which the data is classified according to a type of application that transmits the data, a queue size, and a predetermined critical value,
    determine a transmission scheme according to a determination result of whether traffic is saturated or not and the AC of the data,
    determine, in a media access control (MAC) layer, a potential pattern of traffic,
    predict next state data according to the determined potential pattern, determine the transmission scheme by using the next state data, obtain a bit error rate (BER) value according to a channel condition,
    determine an aggregation parameter based on the AC and the BER value
    determine whether error adaptation is needed or not based on at least one of the channel condition and whether the AC is changed, and
    determine the transmission scheme if the error adaptation is determined to be needed; and a transceiver configured to transmit the data according to the determined transmission scheme, wherein the processor is further configured to predict an AC of data which is to be transmitted after the data transmitted by the data transmitting device, and wherein the next state data comprises the predicted AC of the data which is to be transmitted after the data transmitted by the data transmitting device.

11. The device of claim 10, wherein the transmission scheme determined by the processor comprises at least one of a frame aggregation or fragmentation scheme and waiting time.

12. The device of claim 10, wherein the processor is further configured to: determine the AC to which the data belongs, compare the queue size and the predetermined critical value per the AC of the data, and when the queue size is equal to or greater than the predetermined critical value, determine that traffic is saturated.

13. The device of claim 10, wherein the data transmitting device aggregates or fragments a frame according to the aggregation parameter, and further comprises a transceiver configured to transmit the aggregated or fragmented frame.

14. The device of claim 10, wherein the aggregation parameter comprises at least one of a minimum frame size, a maximum frame size, and an optimal frame size which are determined according to the tolerance of loss rates required according to the AC.

15. The device of claim 10, wherein the next state data further comprises a queue size and a data rate of the data which is to be transmitted after the data transmitted by the data transmitting device.

16. The device of claim 10, wherein the processor is further configured to determine the potential pattern of the traffic by using a data mining technique.

17. The device of claim 10, wherein the AC comprises at least one of voice, video, and best-effort transmission.

\* \* \* \* \*